US010565433B2

(12) United States Patent
Wechsler et al.

(10) Patent No.: US 10,565,433 B2
(45) Date of Patent: Feb. 18, 2020

(54) AGE INVARIANT FACE RECOGNITION USING CONVOLUTIONAL NEURAL NETWORKS AND SET DISTANCES

(71) Applicant: George Mason University, Farifax, VA (US)

(72) Inventors: Harry Wechsler, Fairfax, VA (US); Hachim El Khiyari, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 85 days.

(21) Appl. No.: 15/936,525

(22) Filed: Mar. 27, 2018

(65) Prior Publication Data

US 2018/0293429 A1 Oct. 11, 2018

Related U.S. Application Data

(60) Provisional application No. 62/478,837, filed on Mar. 30, 2017.

(51) Int. Cl.
*G06K 9/00* (2006.01)
*G06F 21/32* (2013.01)
(Continued)

(52) U.S. Cl.
CPC ......... *G06K 9/00288* (2013.01); *G06F 21/32* (2013.01); *G06K 9/00228* (2013.01); *G06K 9/00281* (2013.01); *G06K 9/00926* (2013.01); *G06K 9/4628* (2013.01); *G06K 9/6271* (2013.01); *G06N 3/02* (2013.01); *G06N 3/0454* (2013.01); *G06N 3/08* (2013.01)

(58) Field of Classification Search
CPC .......... G06K 9/00288; G06K 9/00228; G06K 9/00281; G06K 9/00926; G06K 9/4628; G06K 9/6271; G06N 3/02; G06N 3/0454; G06N 3/08; G06F 21/32
See application file for complete search history.

(56) References Cited

U.S. PATENT DOCUMENTS 7,130,454 B1  10/2006  Berube et al.
8,180,112 B2   5/2012  Kortz et al.
(Continued)

OTHER PUBLICATIONS

F. Li, H. Wechsler, "Open set face recognition using transduction", IEEE Transactions on Pattern Analysis and Machine Intelligence, vol. 27, No. 11, pp. 1686-1697, Nov. 2005.
A. Lanitis et al., (2002) "Toward Automatic Simulation of Aging Effects on Face Images", IEEE Transactions on Pattern Analysis and Machine Intellgience, 24, pp. 442-455.
(Continued)

*Primary Examiner* — Leon Flores
(74) *Attorney, Agent, or Firm* — W & C IP (57) ABSTRACT

Time lapse, characteristic of aging, is a complex process that affects the reliability and security of biometric face recognition systems. Systems and methods use deep learning, in general, and convolutional neural networks (CNN), in particular, for automatic rather than hand-crafted feature extraction for robust face recognition across time lapse. A CNN architecture using the VGG-Face deep (neural network) learning produces highly discriminative and interoperable features that are robust to aging variations even across a mix of biometric datasets. The features extracted show high inter-class and low intra-class variability leading to low generalization errors on aging datasets using ensembles of subspace discriminant classifiers.

20 Claims, 4 Drawing Sheets

(51) Int. Cl.
*G06N 3/02* (2006.01)
*G06N 3/08* (2006.01)
*G06K 9/46* (2006.01)
*G06K 9/62* (2006.01)
*G06N 3/04* (2006.01)

(56) References Cited

U.S. PATENT DOCUMENTS

| | | | |
|---|---|---|---|
| 8,265,410 | B1 | 9/2012 | Konoplev |
| 8,842,889 | B1 | 9/2014 | Konoplev et al. |
| 9,542,390 | B2 | 1/2017 | Shankaranarayana |
| 9,600,064 | B2 | 3/2017 | Lee et al. |
| 9,858,296 | B2 | 1/2018 | Gupta et al. |
| 9,904,844 | B1 | 2/2018 | Asati et al. |
| 2012/0230545 | A1* | 9/2012 | Zhang ............... G06K 9/00221 382/103 |
| 2014/0085293 | A1 | 3/2014 | Konoplev et al. |
| 2017/0076145 | A1* | 3/2017 | Gottemukkula ... G06K 9/00288 |
| 2017/0351905 | A1* | 12/2017 | Wang ............... G06K 9/00241 |
| 2018/0075317 | A1* | 3/2018 | Gomez Suarez .... G06K 9/4671 |

OTHER PUBLICATIONS

H. Ling et al., (2010) "Face Verification Across Age Progression Using Discriminative Methods", IEEE Transactions on Information Forensics and Security, 5, pp. 82-91.

S. Biswas et al., (2008) "A Non-Generative Approach for Face Recognition Across Aging", 2nd IEEE International Conference on Biometrics Theory, Applications and Systems, pp. 1-6.

O. Parkhi et al., "Deep Face Recognition", Proceedings of the British Machine Vision Conference, Swansea, UK, 2015.

A. Wedaldi, K. Lenc, (2015) "MatConvNet: Convolutional Neural Networks for MATLAB", Proceedings of the 23rd ACM Conference on Multimedia, Brisbane, Australia, Oct. 26-30, 2015, pp. 689-692.

M. Dubuisson, A.K. Jain, (1994) "A modified Hausdorff distance for object Matching", Proceedings of the 12th Int. Conference on Pattern Recognition (ICPR), Jerusalem, Oct. 9-13, 1994, pp. 566-568.

S. Lawrence et al., "Face Recognition: A Convolutional Neural-Network Approach", IEEE Transactions of Neural Networks 8(1):98-113 (Jan. 1997).

* cited by examiner

AGE INVARIANT FACE RECOGNITION USING CONVOLUTIONAL NEURAL NETWORKS AND SET DISTANCES

BACKGROUND OF THE INVENTION

Field of the Invention

The present invention generally relates to face recognition systems and methods and, more particularly, to a deep learning and set-based approach to face recognition subject to aging.

Background Description

Biometrics refers to the automatic recognition (verification and identification) of individuals based on their physical appearance, behavioral traits, and/or their compound effects. Common biometric modalities include face, fingerprints, iris, voice, signature, and hand geometry. Face authentication for recognition purposes in uncontrolled settings is challenged by the variability found in biometric footprints. Variability is due to intrinsic factors such as aging, or extrinsic factors such as image quality, pose, or occlusion. The performance of a biometric system further depends on demographics, image representation, and soft biometrics. Biometric security systems based on facial characteristics face a challenging task due to variability in the intrapersonal facial appearance of subjects traced to factors such as pose, illumination, expression and aging.

Biometrics is widely used in forensics and security applications such as access control and surveillance. The face biometric traits are usually extracted using a camera sensor and are represented as templates. A database known as the gallery stores the templates for all the known subjects. Given an unknown subject (probe), a biometric system can be used for either verification or identification. In verification mode, a probe template is compared to a single template from the gallery to determine if the two templates belong to the same subject or not. In identification mode, the probe template is compared to all the templates in the gallery to determine the closest match. Identification can be viewed as multiple verifications. The biometric gallery is built during the enrollment process when the biometric traits of all the known subjects are extracted and stored as templates in the database. Often, gallery and probe templates are composed of several biometric samples for each subject. This is the case for example in forensics applications where an examiner may be given several biometric samples of a subject to compare against enrolled templates in a gallery. Other applications include surveillance where multiple images for each subject can be extracted from video, and access control applications where an individual may be re-enrolled several times.

Biometric security systems based on facial characteristics face a significant challenge when there are time gaps between the subjects' probe images and the corresponding enrolled images in the gallery. The system must be robust to aging, which alters the facial appearance. In applications, such as real time surveillance, the probe images are taken at a later time than gallery images. In other scenarios, like missing children identification, the probe images are taken at an earlier time than enrolled images.

Time lapse characteristic of face aging is a complex process that has been studied in various disciplines including biology, human perception and more recently in biometrics. The effects of aging alter both the shape and texture of the face and vary according to age, time lapse and demographics such as gender and ethnicity. From birth to adulthood the effects are encountered mostly in the shape of the face, while from adulthood through old age aging affects the face texture (e.g., wrinkles). Face aging is also affected by external factors such as environment and lifestyle. Face recognition across time lapse belongs to the general topic of face recognition in uncontrolled or wild settings and affects security solutions that involve human biometrics. The challenge is substantial since the appearance of human subjects in images used for training or enrollment can vary significantly from their appearance during the ultimate recognition. To address these challenges, robust age-invariant methods must be developed.

SUMMARY OF THE INVENTION

It is therefore an object of the present invention to provide systems and methods for facial recognition subject to aging.

According to the invention, there is provided a deep learning and set-based approach to face recognition subject to aging. A robust feature extraction method based on deep convolutional neural networks (CNN) and transfer learning is used. A set-based matching approach is used where the probe and gallery templates are treated as collections of images rather than singletons. Our results show that set-based recognition yields better results than recognition based on singleton images. We further find that recognition performance is better when the probe images are taken at an older age than the gallery images. Both one-to-one matching (verification) and one-to-many matching (identification) are supported by the invention. Several types of set-based similarity distances including set means, extrema, and Hausdorff similarity distances are implemented. Our experimental results show that the choice of similarity distance has a significant impact on performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
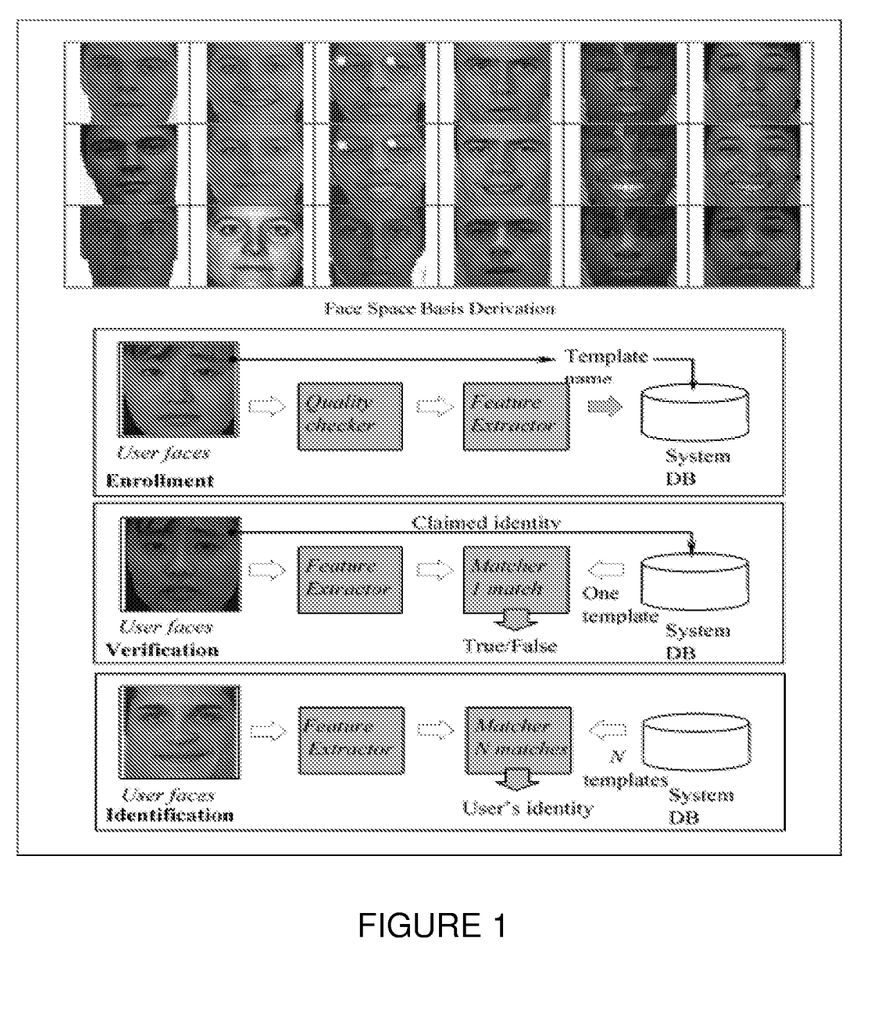
FIG. 1 illustrates face recognition protocol.

The authentication protocol for face recognition is illustrated in FIG. 1. See F. Li and H. Wechsler, "Open set face recognition using transduction", *IEEE Transactions on Pattern Analysis and Machine Intelligence*, vol. 27, no. 11, pp. 1686-1697, November 2005. The face space derivation involves the projection of face images into a lower dimensional subspace while seeking to preserve class discriminatory information for successful authentication of subjects. During the enrollment phase, the biometric features extracted from facial images are saved as templates. Matching can then take place against a single template (for verification), or against a list of candidate templates (for identification). Decisions are based on the confidence of the prediction. Best practices and protocols are further necessary to ensure both privacy and security in uncontrolled environments. Uncontrolled settings include pose, illumination, expression, and aging.

Age invariant face recognition is important in many applications such as access control, government benefit disbursement, and criminal investigations. A robust matching algorithm should allow identification even if there's a significant time gap between the enrolled template and the probe image. Age invariant face recognition can also help reduce operational costs by minimizing the need for re-enrollment. Some common applications of face recognition are listed in Table 1.

TABLE 1

Face Recognition Applications

| Government | Forensics | Commercial |
|---|---|---|
| Biometric Passport | Corpse Identification | Access Control |
| Homeland Security | Criminal Investigation | Cyber Security |
| Benefit Disbursement | Missing Children | Photo Tagging |

The method according to the invention addresses both identification and verification of face images across time lapse. A longitudinal image database is used for training and testing. Features are extracted automatically using a deep convolutional neural network. The extracted features are more robust to aging variations than handcrafted features. The performance of face recognition subject to aging is evaluated using singletons and set distances.

Existing methods for face aging can be divided into two main groups, generative and discriminative. Generative methods usually rely on statistical models to predict the appearance of faces at different target ages. On the other hand, discriminative methods avoid creating a model for face aging as it would be the case with generative methods. They seek to match images directly for authentication without the intermediary step of creating synthetic faces. The present invention combines aspects from both generative and discriminative methods through the medium of transfer learning. Age invariance can be implemented either at the feature extraction, training and/or recognition levels, respectively. At the feature extraction level, the goal is to derive image descriptors that are robust to intrapersonal aging variation. Lanitis et al. (Lanitis, A., Taylor, C. J. And Cootes, T. F. (2002) "Toward Automatic Simulation of Aging Effects on Face Images", *IEEE Transactions on Pattern Analysis and Machine Intelligence*, 24, pp. 442-455) developed a generative statistical model that allows the simulation or elimination of aging effects in face images. Ling et al. (Ling, H., Soatto, S., Ramanathan, N., and Jacobs, D. W. (2010) "Face Verification Across Age Progression Using Discriminative Methods", *IEEE Transactions on Information Forensics and Security*, 5, pp. 82-91) used Gradient Orientation Pyramids (GOP) by extracting the directions of the gradient vectors at multiple scales while discarding the magnitude components. At the training and testing level, one seeks for robust generalization notwithstanding aging using learning. In Biswas et al. (Biswas, S., Aggarwal, G, Ramanathan, N., and Chellappa, R. (2008) "A Non-Generative Approach for Face Recognition Across Aging", $2^{nd}$ *IEEE International Conference on Biometrics Theory, Applications and Systems*, pp. 1-6), aging was addressed at the recognition level by analyzing and measuring the facial drift due to age progression. If two images are of the same subject then the drift will be coherent, while in images of different subjects, the drift will be extreme or incoherent.

Rather than deriving handcraft features, as it is the case with the papers referred above, this present invention copes first with aging at the feature extraction level. The invention leverages a deep learning approach for automatic feature extraction using a convolutional neural network (CNN). The use of CNN facilitates generalization using a two-stage approach consisting of pre-training first and transfer learning second. The overall approach advanced by the invention further copes with varying image contents and image quality at the recognition level. We use set-based face recognition rather than singleton face recognition to address subject variability across time lapse. This facilitates interoperability in uncontrolled biometric settings for cross-modal generalization over the combined space of features and parameter settings.

Figure 2:
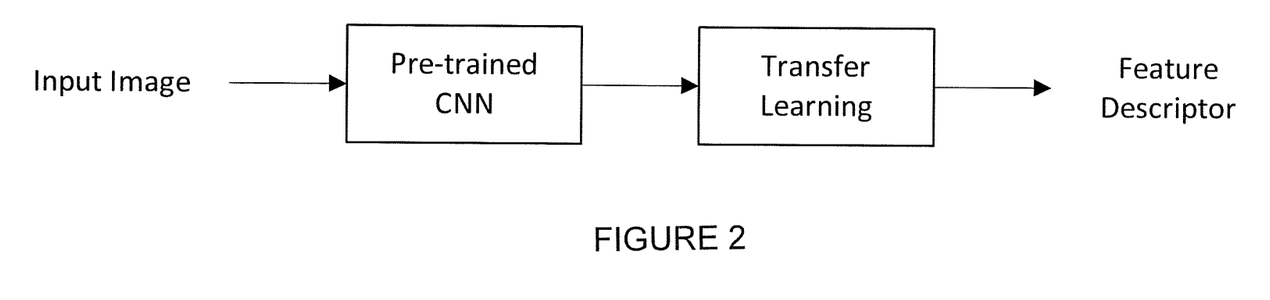
FIG. 2 is a flow diagram for robust feature extraction.

Our method leverages transfer learning by using a pre-trained multilayer convolutional neural network (CNN) to automatically extract features from face images as illustrated in FIG. 2. The multilayer aspect of the convolutional neural network (CNN) allows the extracted features to be highly discriminative and interoperable across aging variation. This approach to feature extraction is more robust to intrapersonal variability compared to handcraft features. This makes our approach more suitable to deployment in security systems engaged with uncontrolled settings.

Figure 3:
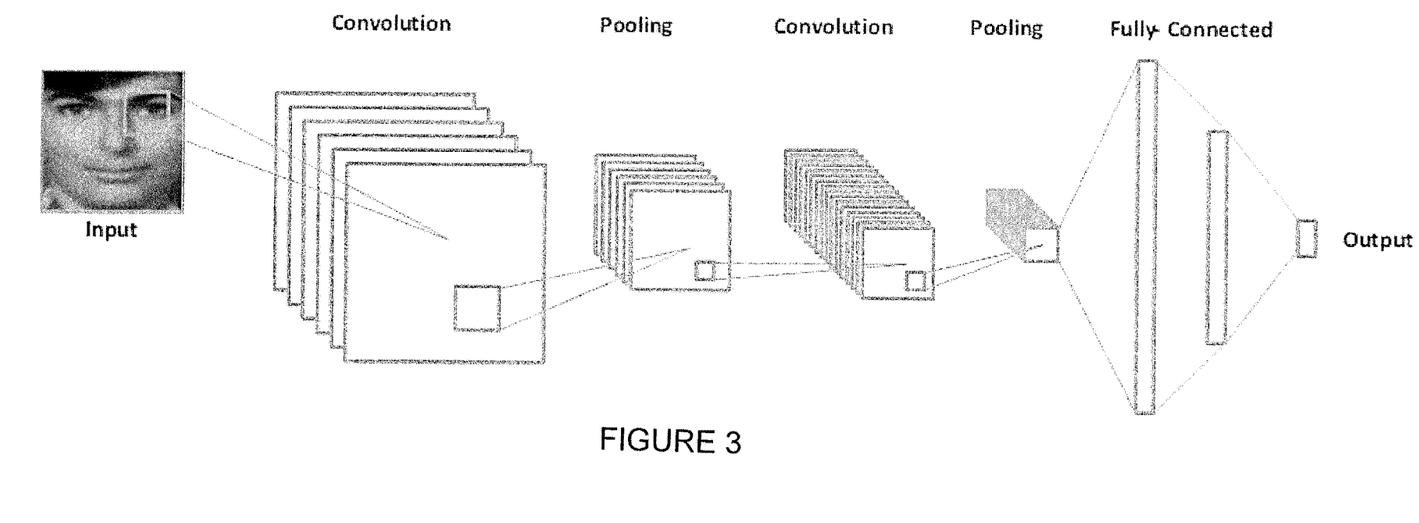
FIG. 3 is a block diagram of a convolutional neural network (CNN) composed of convolution, pooling and fully connected layers.

Convolutional neural networks are artificial neural networks that include both fully connected and locally connected layers known as convolutional layers. In large ("deep") convolutional networks, it is common to see other types of layers such as pooling, activation, and normalization (Rectified Linear Units) layers. CNNs have been found recently to be most successful for both object classification and automatic rather than handcrafted feature extraction. The architecture of a simple convolutional neural network consisting of two convolutional layers, two pooling layers, and three fully connected layers is shown in FIG. 3.

Figure 4:
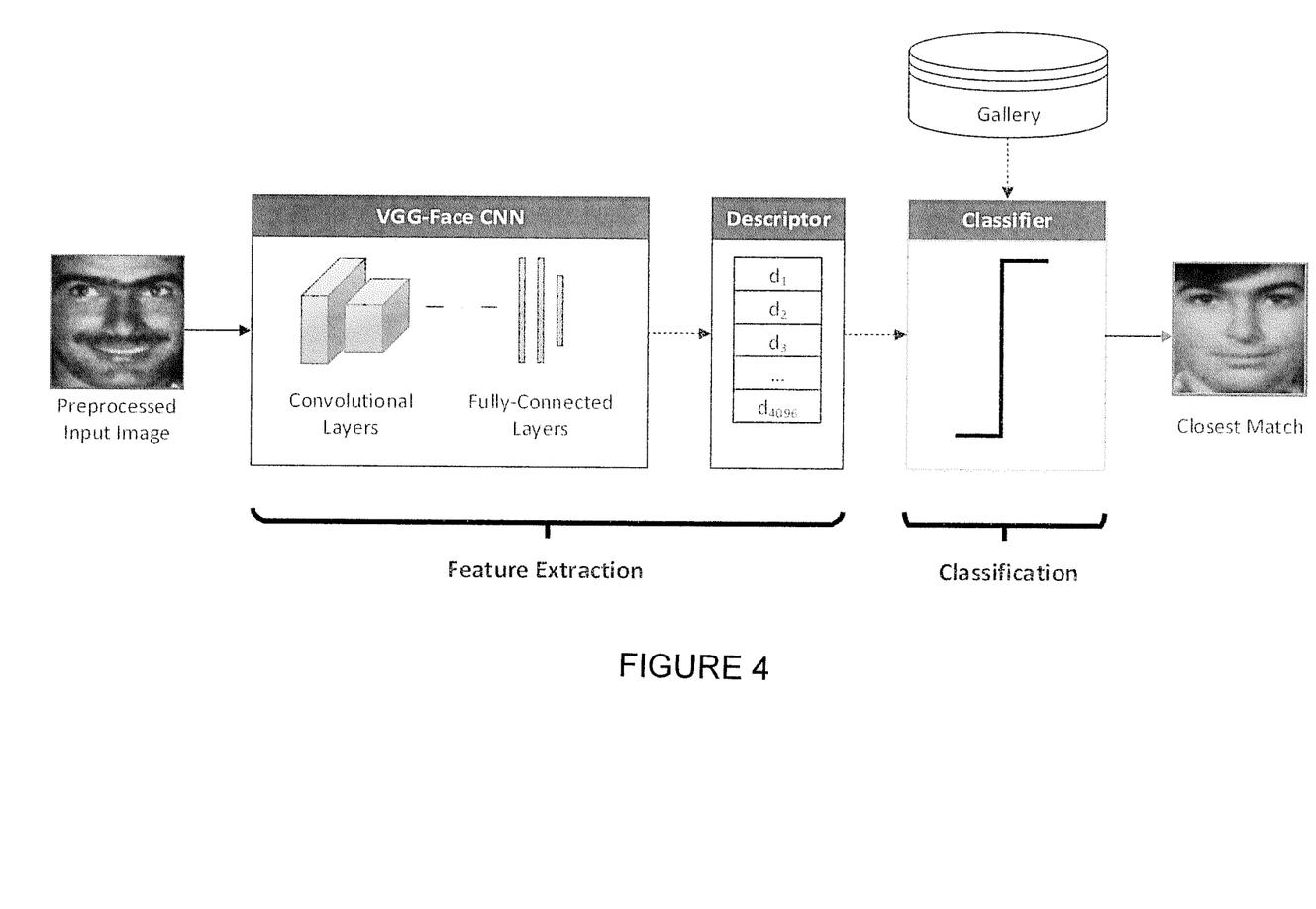
FIG. 4 is a block diagram of the modular authentication architecture using pre-trained VGG-Face CNN and set-based approach to face recognition according to the invention.

Due to the limited size of our training dataset, we leverage the pre-trained VGG-Face CNN as described by Parkhi O., Vedaldi A., and Zisserman, A., "Deep Face Recognition", *Proceedings of the British Machine Vision Conference*, Swansea, U K, 2015. Training deep convolutional neural networks from scratch is difficult since training can require extensive computational resources and large amounts of training data. If such resources are not available, one can use a pre-trained network's activations layers as feature extractors. In our experiments, we use VGG-Face CNN, which is a deep convolutional neural network based on the VGG-Net architecture. As illustrated in FIG. 3, the VGG-Face CNN architecture is composed of a sequence of convolutional, pool, and fully connected (FC) layers. The VGG-Face is used as a feature extractor for any arbitrary face image by running the image through the entire network, then extracting the output of the first fully-connected layer. The extracted feature vector serves as a highly discriminative, compact, and interoperable encoding of the input image. Once the features are extracted from the fully-connected layer of the VGG-Facew CNN, they can be used for training and testing arbitrary face classifiers. The convolutional layers use filters of dimension three while the pool layers perform subsampling with a factor of two. VGG-Face CNN was trained using a large dataset of 2.6 million images of 2622 celebrities collected from the Web. Activations of the first fully connected layers of VGG-Face CNN are treated as feature descriptors, which can then be used for classification on a new target dataset. The features found are then used for both face identification and face verification. FIG. 4 shows the feature extraction process using VGG-Face for a face identification task.

With reference to FIG. 4, there is shown the modular authentication architecture of the system according to the invention using VGG-Face CNN feature descriptors. An input device 41, which can be a digital camera or other digital source of a facial image, provides an input of a facial image to a feature extraction unit 42. The input device includes image preprocessing functions including face detection and subsequent image normalization in terms of pose and image size. The feature extraction unit comprises a VGG-Face CNN unit 421 which, as mentioned above, is a deep convolutional neural network based on the VGG-Net architecture. This is followed by a descriptor unit 422 which receives the output of the VGG-Face CNN unit 421. This is the unit in combination with the CNN that extracts compact, highly discriminative and interoperable feature descriptors. Feature extraction is about capturing face descriptors using CNN rather than hand-crafted features as current face aging methods do. The extracted descriptors from the input facial image are input to the classifier unit 43 which accesses data in a biometric gallery 44. The biometric gallery is built during an enrollment process when biometric traits of all known subjects are extracted as feature descriptors and stored as sets of image templates in a database. The classifier receives the extracted descriptors and compares them with descriptors of subjects enrolled in the gallery using set similarity distances chosen by the classifier. Based on the outcome of the comparisons performed, the classifier unit 43 outputs a closest match image on an output device 45. The output device can be a video display device or a printer. If a match is not found, the output device provides an output indicating that no match was found.

Most face recognition methods rely on the representation and comparison of individual images (singletons). This invention uses the gallery subjects as sets of image templates rather than mere singletons. First, we extract features from each image using the pre-trained VGG-Face convolutional neural network 42. Secondly, we group the extracted features as sets to form the biometric templates of different subjects in gallery 44. The distance between subjects is the similarity distance between their respective sets.

We evaluate performance for identification and verification using both singleton and set similarity distances. Given two feature image vectors a and b, the singleton similarity distance is the Euclidean distance d $(a,b)=\|a-b\|$. For two image feature sets $A=\{a_1, \ldots, a_{N_a}\}$ and $B=\{b_1, \ldots, b_{N_b}\}$, we define the similarity distances between the two sets as follows:

Minimum Distance (MIN-$D$)

$$h_{min}(A, B) = \min_{\substack{a \in A \\ b \in B}} d(a, b) \tag{1}$$

Maximum Distance (MAX-$D$)

$$h_{min}(A, B) = \max_{\substack{a \in A \\ b \in B}} d(a, b) \tag{2}$$

Directed *Hausdorff* Distance (*D-HD*)

$$h_d(A, B) = \max_{a \in A} \left\{ \min_{b \in B} \{d(a, b)\} \right\} \tag{3}$$

Undirected *Hausdorff* Distance (*U-HD*)

$$h_u(A, B) = \max(h_d(A, B), h_d(B, A)) \tag{4}$$

Directed Modified *Hausdorff* Distance (*UM-HD*)

$$H_{dm}(A, B) = \frac{1}{N_a} \sum_{a \in A} \left\{ \min_{b \in B} \{d(a, b)\} \right\} \tag{5}$$

Undirected Modified *Hausdorff* Distance (*UM-HD*)

$$H_{um}(A, B) = \frac{h_{dm}(A, B) + h_{dm}(B, A)}{2} \tag{6}$$

Figure 5:
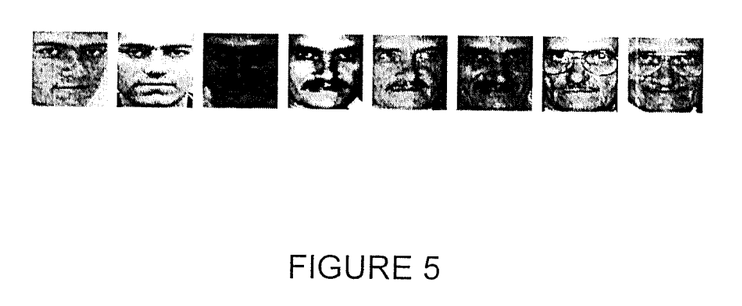
FIG. 5 illustrates face images from FG-NET dataset.

We used the publicly available FG (Face and Gesture)-NET dataset. FIG. 5 illustrates face images from FG-NET dataset. FG-NET includes multiple images per subject reflecting variability in age, in addition to intrinsic variability such as pose, illumination and expression (PIE). The dataset contains 1002 images of 82 subjects where subjects' ages vary between 0 and 69. CNN descriptors were extracted from the datasets and used for identification and verification with the VGG-Face features provided by the first fully connected layer, FC-1.

For each subject, we separated the images in two roughly equal sized sets. The first set contained the subject's youngest images while the second set contained the subject's oldest images. For both identification and verification, we conducted two experiments to evaluate the performance of set-based identification across time lapse. In the first experiment (young/old), half of the images corresponding to the youngest ages were used in the gallery, while the second half corresponding to the oldest ages was used for testing. In the second experiment (old/young), the gallery and test datasets were reversed.

All images were normalized using in-plane rotation to horizontally align the left and right eyes. The eye coordinates are available from the metadata provided with the FG-NET dataset. The datasets images were re-scaled to a standard 224×224 size and fed to the convolutional neural network using either their original three color channels or the gray level channel replicated three times. The neurons of the first convolutional layer compute dot products for their receptive fields along all three channels. A sample of preprocessed images for FG-NET is shown in FIG. 5.

We used the VGG-Face CNN provided in the MatConvNet toolbox for feature extraction. See Vedaldi, A. and Lenc, K. (2015) "MatConvNet: Convolutional Neural Networks for MATLAB", *Proceedings of the 23rd ACM Conference on Multimedia*, Brisbane, Australia, 26-30 Oct. 2015, pp. 689-692. The VGG-Face CNN network described with reference to FIG. 3 has a deep architecture consisting of 3×3 convolution layers, 2×2 pooling layers, ReLu layers, and 3 fully connected layers. While the network is originally trained to perform classification rather than feature extraction, the output layer of the network was not used in our experiments. Instead, we extract 4096-dimensional descriptors from the activation of the first fully connected layer, FC-1. To extract features from an image in our dataset, the image was preprocessed and fed to the CNN as an array of pixel intensities. Each convolutional layer performed a filtering operation on the preceding layer resulting in an activation volume, which in turn became the input of the following layer. Pooling was used throughout the network to reduce the number of nodes by down sampling the activation maps using the max operator. The fully connected layers of the network were used for learning the classification function. The extracted features from the output of the first fully connected layers (FC-1) were L2-normalized by dividing each component by the L2-norm of the feature vector. The normalized features were then used for identification and verification.

The design of the first experiment (young/old) is described below. The design of the second experiment (old/young) is identical with the gallery and test dataset reversed. The gallery is composed of the young images for each subject while the testing dataset is composed of the old images for each subject. Identification performance results are shown in Table 2.

Singletons:

For each image in the testing set, we assigned the identity of the closest neighbor in the gallery using the Euclidean similarity distance.

Set Means:

We grouped the images of each subject in the test dataset and gallery into sets. We computed the mean vector of each set in the gallery and test datasets. Classification was performed on the mean vectors, where each mean vector in the test dataset was assigned the identity of the closest mean vector in the gallery using the Euclidean similarity distance.

Set Distances:

We grouped the images of each subject in the test dataset and gallery into sets. Each subject in the test dataset was assigned the identity of the closest match in the gallery based on the corresponding similarity distances.

As shown in Table 2, best performance is achieved using set similarity distances based on minimum or Hausdorff distances.

In verification, we compared each element in the test dataset with each element in the gallery set to determine if they belong to the same subject or not. Subjects were represented as individual images (singletons), set means, or sets of images. Our experimental design included constructing image pairs of singletons, set means, and sets, where each pair contains one subject from the test dataset and one subject from the gallery. Pairs were labeled as positive, if both elements belonged to the same subject, or negative if they belonged to different subjects. For each pair, we computed the similarity distance between the elements. Distances associated with positive pairs are expected to be smaller than distances associated with negative pairs. The discrimination threshold value for verification is that similarity distance such that given an unknown pair, the pair is labeled as positive if the distance is below the threshold or negative otherwise. Our goal was to find an optimal threshold that minimizes the verification error. Such errors can be of two types as shown in Table 3. False accept errors are reported using the False Accept Rate (FAR), which is the percentage of negative pairs labeled as positive. False reject errors are reported using the False Reject Rate (FRR), which is the percentage of positive pairs labeled as negative. There's a tradeoff between FAR and FRR as the threshold value varies. The Equal Error Rate (EER) corresponding to that threshold value where the FAR and FRR are equal was computed. Lower EER values signify overall better verification performance.

TABLE 3

Truth Table for Verification Prediction

|  | Positive | Negative |
|---|---|---|
| Positive | True Accept (Correct) | False Reject |
| Negative | False Accept | True Reject (Correct) |

Table 4 shows our experimental results for EER verification. Lower EER values indicate better performance. As in face identification, best performance is achieved using set similarity distances based on minimum or Hausdorff distances.

TABLE 2

Accuracy Rates for Face Aging Identification Using Singletons and Image Sets

|  | Singletons | Set Means | Set Similarity Distances ||||||
|---|---|---|---|---|---|---|---|---|
|  |  |  | MIN-D | MAX-D | D-HD | U-HD | DM-HD | UM-HD |
| Identification (young/old) | 0.58 | 0.61 | 0.82 | 0.24 | 0.58 | 0.33 | 0.8 | 0.79 |
| Identification (old/young) | 0.4 | 0.51 | 0.71 | 0.13 | 0.18 | 0.21 | 0.61 | 0.63 |

TABLE 4

Equal Error Rate (EER) for Face Verification Using Singletons and Image Sets

| | Single-tons | Set Means | Set Similarity Distances | | | | | |
|---|---|---|---|---|---|---|---|---|
| | | | MIN-D | MAX-D | D-HD | U-HD | DM-HD | UM-HD |
| Identification (young/old) | 0.28 | 0.16 | 0.12 | 0.37 | 0.23 | 0.3 | 0.12 | 0.15 |
| Identification (old/young) | 0.28 | 0.16 | 0.12 | 0.37 | 0.34 | 0.3 | 0.18 | 0.15 |

Singletons:

We constructed image pairs where each pair contains one image from the test dataset and one image from the gallery. The EER is computed based on the Euclidean similarity distances between the image pairs.

Set Means:

We grouped the images of each subject in the test dataset and gallery into sets. We computed the mean vector of each set of images in the gallery and test datasets. Pairs were constructed from mean vectors where one vector belonged to the test dataset and the other belonged to the gallery. The EER was based on the Euclidean similarity distance between mean vectors.

Set Distances:

We grouped the images of each subject in the test and gallery into sets. We compared pairs of sets where each pair was composed of one set from the test dataset and one set from the gallery. The EER values reported in Table 4 use the set similarity distances defined above.

Our experimental results show that sets work better than singletons for aging face recognition using both identification and verification. The choice of the set similarity distance has a significant impact on performance. The minimum distance and modified Hausdorff distance were found to be most robust to face variability due to aging, pose, illumination and expression. They are the top performers for both identification and EER verification. In Dubuisson, M., Jain, A. K. (1994), "A modified Hausdorff distance for object Matching", *Proceedings of the 12th Int. Conference on Pattern Recognition (ICPR)*, Jerusalem, 9-13 Oct. 1994, pp. 566-568, the minimum distance was found to be more susceptible to noise than the modified Hausdorff distance in object matching. In our results, however, we find that it yields the best performance for aging face recognition under uncontrolled settings. On the other hand, the maximum distance performs the worst due to the large intrapersonal variability in face appearance. The modified Hausdorff distance works better than the standard Hausdorff distance due to its robustness to noise. The results also show that it is easier to recognize older subjects rather than younger subjects. Similar results were found in the case of singletons. Here we show that those findings apply to sets as well. The better performance reported for our approach is reflected in generalization due to transfer learning and local processing due to the combined use of CNN and robust similarity distances for set images rather than singletons.

The present invention addresses the challenge of face recognition subject to aging by using an approach based on deep learning and set similarity distances. We leverage a pre-trained convolutional neural network (CNN) to extract compact, highly discriminative and interoperable feature descriptors. We evaluated the performance of one-to-one matching (verification) and one-to-many matching (identification) for singletons and images sets. In both verification and identification, set distances perform better than singletons and that minimum distances and minimum modified Hausdorff distances yield the best performance overall.

The invention advances the art of both identification and verification by the application of deep learning using pre-trained convolutional neural networks to extract compact, highly discriminative and interoperable feature descriptors followed by a set-based approach to face recognition subject to aging. The set similarity distances are chosen to maximize performance.

While the invention has been described in terms of preferred embodiments, those skilled in the art will recognize that the invention can be practiced with modification within the spirit and scope of the appended claims.

The invention claimed is:

1. An age invariant face recognition system comprising:
    an input device for acquiring a representation of a facial image;
    a pre-trained convolutional neural network receiving said representation of the facial image and extracting compact, highly discriminative and interoperable feature descriptors;
    a biometric gallery built during an enrollment process when biometric traits of all known subjects are extracted as feature descriptors and stored as sets of image templates in a database;
    a classifier receiving said feature descriptors from the convolutional neural network and comparing said feature descriptors with feature descriptors of subjects enrolled in the biometric gallery using set similarity distances chosen by the classifier from the group consisting of minimum distance, directed Hausdorff distance, undirected Hausdorff distance, directed modified Hausdorff distance, and undirected modified Hausdorff distance; and
    an output device generating, based on said comparing, a match or no match of face recognition subject to aging, the match being used for authentication or identification.

2. The age invariant face recognition system of claim 1, wherein the input device includes image preprocessing functions including face detection and subsequent image normalization in terms of pose and image size.

3. The age invariant face recognition system of claim 1, wherein the pre-trained convolutional neural network is a visual geometry group (VGG)-Face convolutional neural network composed of a sequence of convolutional, pool and fully-connected layers, activation of a first fully-connected layer producting feature descriptors which are used for both face identification and face verification.

4. The age invariant face recognition system of claim 1, wherein the match of face recognition is used for authentication.

5. The age invariant face recognition system of claim 1, wherein the match of face recognition is used for identification.

6. The age invariant face recognition system of claim 1, wherein the set similarity distances chosen by the classifier are minimum distances.

7. The age invariant face recognition system of claim 6, wherein the minimum set similarity distances are defined as follows:

$$h_{min}(A, B) = \min_{\substack{a \in A \\ b \in B}} d(a, b).$$

8. The age invariant face recognition system of claim 1, wherein the set similarity distances chosen by the classifier are directed Hausdorff distances.

9. The age invariant face recognition system of claim 8, wherein the directed Hausdorff set similarity distances are defined as follows:

$$h_d(A, B) = \max_{a \in A} \left\{ \min_{b \in B} \{d(a, b)\} \right\}.$$

10. The age invariant face recognition system of claim 1, wherein the set similarity distances chosen by the classifier are undirected Hausdorff distances.

11. The age invariant face recognition system of claim 10, wherein the undirected Hausdorff set similarity distances are defined as follows:

$$h_u(A,B) = \max(h_d(A,B), h_d(B,A)).$$

12. The age invariant face recognition system of claim 1, wherein the set similarity distances chosen by the classifier are directed modified Hausdorff distances.

13. The age invariant face recognition system of claim 12, wherein the directed modified Hausdorff set similarity distances are defined as follows:

$$H_{dm}(A, B) = \frac{1}{N_a} \sum_{a \in A} \left\{ \min_{b \in B} \{d(a, b)\} \right\}.$$

14. The age invariant face recognition system of claim 1, wherein the set similarity distances chosen by the classifier are undirected modified Hausdorff distances.

15. The age invariant face recognition system of claim 14, wherein the undirected modified Hansdorff set similarity distances are defined as follows:

$$H_{um}(A, B) = \frac{h_{dm}(A, B) + h_{dm}(B, A)}{2}.$$

16. An age invariant face recognition method comprising the steps of:
acquiring by an input device a representation of a facial image;
receiving said representation of the facial image by a pre-trained convolutional neural network and extracting compact, highly discriminative and interoperable feature descriptors;
building a biometric gallery during an enrollment process when biometric traits of all known subjects are extracted as feature descriptors and stored as sets of image templates in a database;
receiving by a classifier said feature descriptors from the convolutional neural network and comparing said feature descriptors with feature descriptors of subjects enrolled in the biometric gallery using set similarity distances chosen by the classifier from the group consisting of minimum distance, directed Hausdorff distance, undirected Hausdorff distance, directed modified Hausdorff distance, and undirected modified Hausdorff distance; and
generating, based on said comparing, a match or no match by an output device of face recognition subject to aging, the match being used for authentication or identification.

17. The age invariant face recognition method of claim 16, further comprising the step image preprocessing prior to the step of acquiring the representation of a facial image, the step of image preprocessing including face detection and subsequent image normalization in terms of pose and image size.

18. The age invariant face recognition method of claim 16, wherein the pre-trained convolutional neural network is a visual geometry group (VGG)-Face convolutional neural network composed of a sequence of convolutional, pool and fully-connected layers, activation of a first fully-connected layer producting feature descriptors which are used for both face identification and face verification.

19. The age invariant face recognition method of claim 16, further comprising the step of using the match of face recognition for authentication.

20. The age invariant face recognition method of claim 16, further comprising the step of using the match of face recognition for identification.

* * * * *